（12）United States Patent
Kono et al.

(10) Patent No.: US 12,030,148 B2
(45) Date of Patent: Jul. 9, 2024

(54) NC PROGRAM GENERATION SYSTEM AND NC PROGRAM GENERATION METHOD

(71) Applicant: Hitachi, Ltd., Tokyo (JP)

(72) Inventors: Ippei Kono, Tokyo (JP); Kohei Kaiho, Tokyo (JP); Koji Utsumi, Tokyo (JP); Eiji Sakamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 320 days.

(21) Appl. No.: 17/627,939

(22) PCT Filed: May 26, 2020

(86) PCT No.: PCT/JP2020/020805
§ 371 (c)(1),
(2) Date: Jan. 18, 2022

(87) PCT Pub. No.: WO2021/014749
PCT Pub. Date: Jan. 28, 2021

(65) Prior Publication Data
US 2022/0258296 A1 Aug. 18, 2022

(30) Foreign Application Priority Data
Jul. 24, 2019 (JP) .................. 2019-136459

(51) Int. Cl.
*B23Q 15/12* (2006.01)
*G05B 19/4093* (2006.01)
(52) U.S. Cl.
CPC ....... *B23Q 15/12* (2013.01); *G05B 19/40937* (2013.01); *G05B 2219/36186* (2013.01)

(58) Field of Classification Search
None
See application file for complete search history.

(56) References Cited

U.S. PATENT DOCUMENTS

| 4,707,793 A | 11/1987 | Anderson |
| 4,942,611 A | 7/1990 | Kunugi et al. |
| 5,479,353 A | 12/1995 | Nakamura |

FOREIGN PATENT DOCUMENTS

| CN | 109746465 A | 5/2019 |
| JP | S64-005753 A | 1/1989 |
| JP | H04-052908 A | 2/1992 |

(Continued)

OTHER PUBLICATIONS

European Search Report issued on Jul. 3, 2023 for European Patent Application No. 20843463.9.

(Continued)

*Primary Examiner* — Ryan A Jarrett
(74) *Attorney, Agent, or Firm* — Volpe Koenig

(57) ABSTRACT

The present invention provides a technology for generating an NC program which can secure appropriate machining accuracy. Provided is a conversion computer 10 which includes a CPU 11 and generates an NC program for a turning process for a workpiece on a lathe, wherein the CPU 11 is configured to generate an NC program such that displacements caused for a workpiece to be processed on a plurality of machining positions at a time of a turning process are calculated, on the basis of the displacements caused for the workpiece on the plurality of machining positions, a movement path of a tool to be used at the time of the turning process is decided, and the tool is moved through the decided movement path.

16 Claims, 10 Drawing Sheets

(56) References Cited

FOREIGN PATENT DOCUMENTS

| | | | |
|---|---|---|---|
| JP | H06-282321 A | 10/1994 | |
| JP | H09-150348 A | 6/1997 | |
| JP | 2002-230317 A | 8/2002 | |
| JP | 2006-007397 A | 1/2006 | |
| JP | 2006-231420 A | 9/2006 | |
| JP | 2009-125859 A | 6/2009 | |
| JP | 2011-045962 A | 3/2011 | |
| JP | 2012-206188 A | 10/2012 | |
| WO | 2016/194079 A | 6/2017 | |

OTHER PUBLICATIONS

Benardos, P.G.. "Prediction of Workpiece Elastic Deflections Under Cutting Forces in Turning," Paper, National Technical University of Athens, School of Mechanical Engineering, Greece (2005).

Notice of Reasons for Refusal, Japanese Patent Application No. 2019-136459, Aug. 11, 2020, 4 pgs.

Notice of Reasons for Refusal, Japanese Patent Application No. 2019-136459, Mar. 5, 2021, 5 pgs.

NC PROGRAM GENERATION SYSTEM AND NC PROGRAM GENERATION METHOD

TECHNICAL FIELD

The present invention relates to a technology for generating an NC program for numerical control (NC).

BACKGROUND ART

In recent years, a turning operation on an object to be processed (hereinafter referred to as workpiece) is sometimes performed by inputting a NC program into a NC-compatible lathe.

For example, PTL 1 discloses, "In a tool deformation amount correction method where machining is performed by correcting the amount of tool deformation, a tool deformation amount correction method characterized by having a memory that stores tool deformation parameters for calculating the amount of tool deformation, a preprocessing calculation method that reads the processing program and outputs the processing conditions, a tool deformation amount calculation method that calculates the amount of tool deformation from the tool deformation parameters and the machining conditions, a tool correction method that calculates the amount of tool correction, and an adder that adds the amount of tool deformation and the amount of tool correction to the travel command to obtain the travel amount, and interpolation means for interpolating the travel amount is provided".

CITATION LIST

Patent Literature

[PTL 1]
Japanese Patent Application Publication No. H04-52908

SUMMARY OF INVENTION

Technical Problem

In the field of producing products by machining a workpiece, there is a need to improve the machining accuracy of the products.

In the technology disclosed in PTL 1, machining accuracy is improved by correcting the amount of tool deformation. However, there are cases where correction of the amount of tool deformation has little effect on improving machining accuracy.

The present invention has been made in view of the above-mentioned circumstances, and it is an object thereof to provide a technology for generating an NC program capable of securing appropriate machining accuracy.

Solution to Problem

An NC program generation system according to one aspect has been made by focusing, for example, on the fact that the cause of a processing error in a product is deformation of a workpiece in turning process such as turning process on an elongated workpiece. An NC program generation system according to one aspect includes a processor, for generating an NC program for turning process of a workpiece by a lathe, the processor is configured to: calculate a displacement generated on a workpiece to be processed at a plurality of process positions during turning process; determine, on the basis of the displacement generated on the workpiece at the plurality of process positions, a movement path of a tool used during the turning process; and generate an NC program for moving the tool by the determined movement path.

Advantageous Effects of Invention

According to the present invention, an NC program capable of securing appropriate machining accuracy can be generated.

DESCRIPTION OF EMBODIMENTS

Embodiments are described with reference to the drawings. The following embodiments are not intended to limit the invention according to the claims, and not all of the elements and combinations thereof described in the embodiments are essential to the solution of the invention.

Embodiment 1

<System Configuration>

Figure 1:
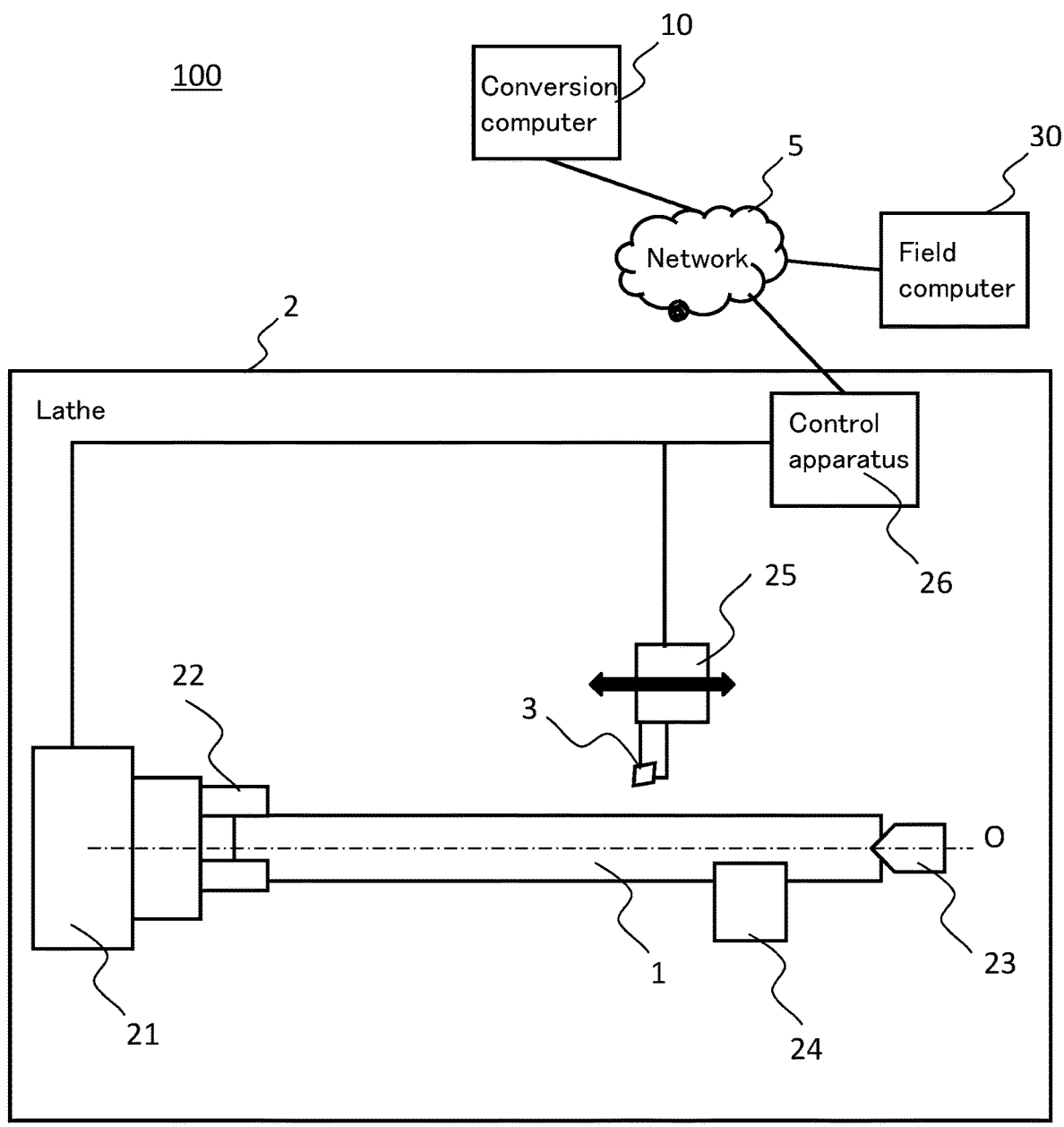
FIG. 1 is an overall configuration diagram of a processing system according to Embodiment 1.

FIG. 1 is an overall configuration diagram of a processing system according to Embodiment 1.

A processing system 100 includes a conversion computer 10 as an example of an NC program generation system, a lathe 2, and a field computer 30. The conversion computer 10, the lathe 2, and the field computer 30 are coupled via a network 5. The network 5 may be a wired network or a wireless network. For example, the lathe 2 and the field computer 30 may be disposed at the same location.

The conversion computer 10, for example, executes the process of generating an NC program for turning with higher machining accuracy (after-correction NC program) from an NC program generated by CAM (Computer Aided Manufacturing) (before-correction NC program). The details of the conversion computer 10 will be described later.

The lathe 2 includes a main spindle 21, a fixing jig 22, a tailstock 23, a stopper 24, a tool rest 25 as an example of a tool fixing unit, and a control apparatus 26.

The main spindle 21 supports the fixing jig 22 so as to be rotatable. The fixing jig 22 is a jig for fixing a workpiece 1. Typically, the fixing jig 22 is a chuck. The fixing jig 22 may be fixing jig using bolt fastening, magnets, or the like; in short, it should be capable of fixing the workpiece 1 to the main spindle 21. With this configuration, the workpiece 1 is rotatably fixed to the main spindle 21 of the lathe 2 via the fixing jig 22.

The tailstock 23 is disposed on a rotation axis O of the main spindle 21 at a position opposed to the main spindle 21. The tailstock 23 contacts an end surface of the workpiece 1 fixed to the main spindle 21 via the fixing jig 22 on the side opposite to an end surface thereof on the main spindle 21 side, and fixes the workpiece 1 so as to be rotatable. The stopper 24 supports the side surface of the workpiece 1 to prevent runout of the workpiece 1 during the turning process. According to the stopper 24, a workpiece with low rigidity can be machined appropriately, and the machining accuracy of the turning process can be increased.

The tool rest 25 fixes the tool 3. The tool rest 25 is, for example, a turret, capable of fixing multiple tools, and by rotating the tool rest 25, the tool to be used for machining can be selected. The tool rest 25 does not have to be a turret, and may be capable of exchanging a tool stored in a tool magazine with a tool fixed to the tool rest 25 by an ATC (Automatic ToolChanger) apparatus (not illustrated), or may be capable of installing tools manually. The tool rest 25 may be equipped with a rotating spindle and may be capable of mounting a rotating tool such as a drill. The tool rest 25 is movable, for example, in the direction of the rotation axis O (which may not strictly coincide with this direction due to errors) or in the radial direction of the rotation axis O (which may not strictly coincide with this direction due to errors) by a drive mechanism (not illustrated), based on the control of the control apparatus 26.

The tool 3 may also include an integrated bite with a cutting edge, an insert with a cutting edge and a bite to which the insert is mounted, and a holder to fix these bites to the tool rest 25.

The control apparatus 26 controls the turning process by reading the NC program stored in an internal recording apparatus not illustrated in the figure, and controlling the operation of the workpiece and the tool based on the machining parameters (machining speed and feed rate) and the machining path (movement path) described in the NC program. The NC program may be data in which the lathe operation is described in a format such as G-code, or it may be data in a format which the lathe operation cannot be directly controlled such as CL (Cutter Location) data and in which the machining parameters and lathe operation such as the machining path and rotation speed are described. The control apparatus 26 may have a machining path generation function that generates a machining path (movement path) from the machining geometry and machining conditions.

In the lathe 2, without the tailstock 23, the opposite end of the workpiece 1 to the main spindle 21 can be turned without fixing it, so that the turning process is performed in the so-called cantilevered state. In a lathe having spindles on both sides, the opposite end of the workpiece 1 may be rotatably fixed to the other spindle via a fixing jig connected to that spindle, without a tailstock 23. The lathe 2 may also not be equipped with a stopper 24.

Next, the conversion computer 10 is described in detail.

Figure 2:
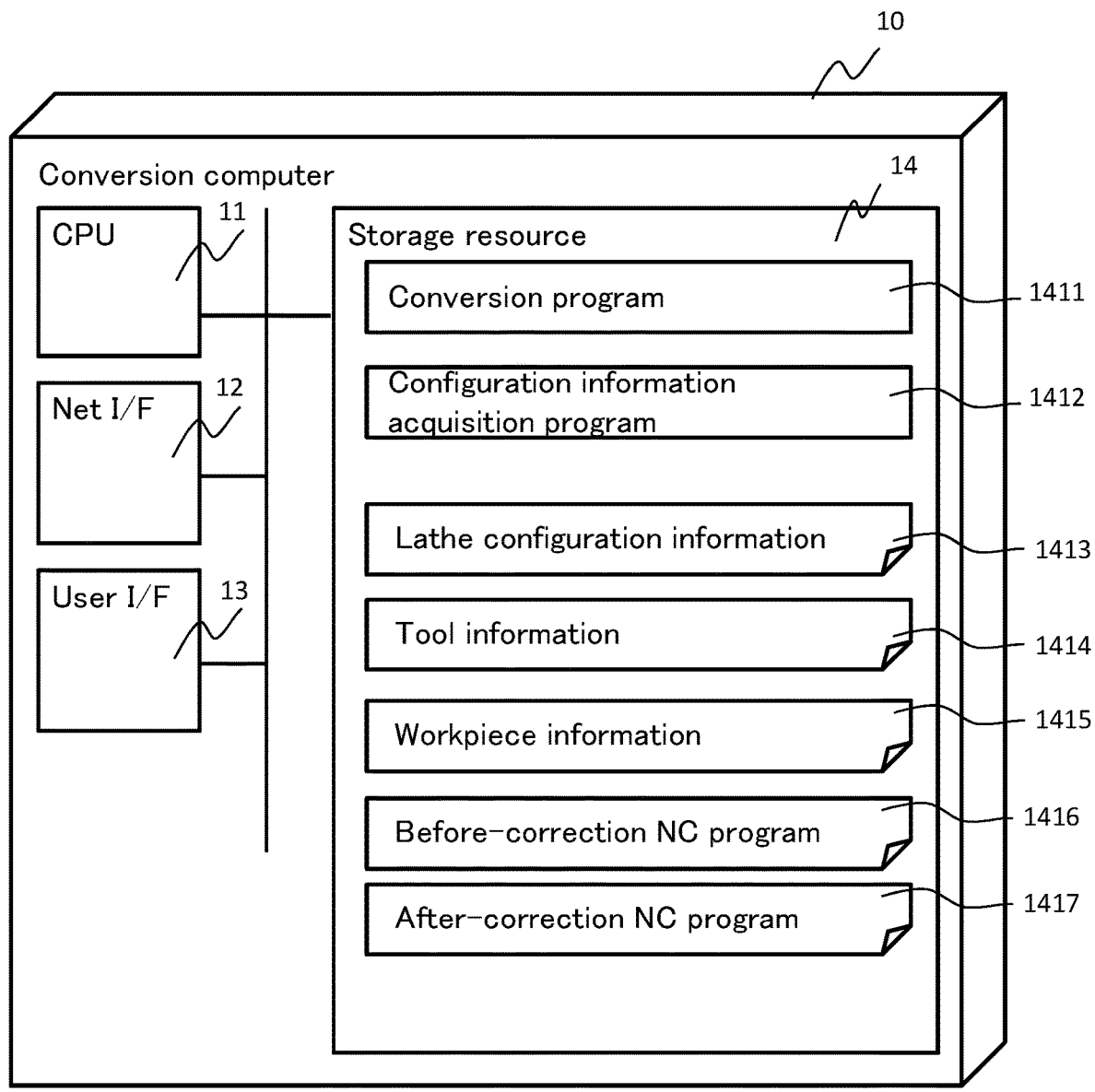
FIG. 2 is a configuration diagram of a conversion computer according to Embodiment 1.

FIG. 2 is a configuration diagram of the conversion computer according to Embodiment 1.

<<Hardware>>

The conversion computer 10 is, for example, a personal computer or a general-purpose computer. The conversion computer 10 includes a CPU 11 as an example of a processor, a network interface 12 (abbreviated as Net I/F in FIG. 2), a user interface 13 (User I/F in FIG. 2), storage resource 14 as an example of a storage unit, and an internal network for coupling the components.

The CPU 11 can execute programs stored in the storage resource 14. The storage resource 14 stores therein programs to be executed by the CPU 11, various kinds of information used by the programs, and NC programs used by the lathe 2. The storage resource 14 may be, for example, a semiconductor memory, a flash memory, a hard disk drive (HDD), or a solid state drive (SSD). The storage resource 14 may be a volatile memory or a non-volatile memory.

The network interface 12 is an interface for communicating with external apparatuses (for example, control apparatus 26 in lathe 2 and field computer 30) via the network 5.

The user interface 13 is, for example, a touch panel, a display, a keyboard, a mouse, or the like. The user interface 13 may be another device as along as the user interface 13 can receive operations from an operator (user) and display information. The user interface 13 may be configured by these plurality of devices.

<<Data, Etc.>>

The storage resource 14 stores a conversion program 1411, a configuration information acquisition program 1412, lathe configuration information 1413, tool information 1414, work information 1415, a before-correction NC program 1416, and an after-correction NC program 1417. The storage resource 14 may store information other than this. The details of each data and program are described starting from the next paragraph. Each information, or some items of each information, may be omitted.

The lathe configuration information 1413. The lathe configuration information 1413 is configured, for example, as a table that stores information about the lathe 2. The lathe configuration information 1413 includes the following information.

(a1) Identifier of the lathe 2 (lathe ID). The identifier of the control apparatus 26 or the network address may be substituted for the lathe ID.

(a2) Model number of lathe 2.

(a3) Lathe 2 installation location.

(a4) Use result of the lathe 2, e.g., usage time, etc.

(a5) Temperature of a predetermined part of the lathe 2. The predetermined part may be the main spindle 21 of the lathe 20.

(a6) Information on the rigidity of a predetermined part of the lathe 2 (e.g., Young's modulus of the part, amount of deflection, etc.). The predetermined part may be the main spindle 21 or the tool rest 25 of the lathe 2.

(a7) The shape of a predetermined part of the lathe 2. The shape of the predetermined part may be the length of the main spindle 21 of the lathe 2, or the shape of the tool rest 25.

(a8) Offset value configured according to aging and installation environment. This offset value is used to make minor corrections to the coordinates for tool movement in the NC program, for example, to compensate for situations such as the stage being slightly tilted due to aging.

(a9) Manufacturer, model number, etc. of the control apparatus 26. The NC program description format of the control apparatus 26 may differ slightly depending on the manufacturer, or the model number, and the manufacturer and/or the model number are used to determine this situation.

(a10) Rattle of components such as the main spindle 21 and the tool rest 25, movement accuracy (e.g., amount of backlash of the tool rest), linearity, flatness, parallelism, vibration width and frequency during apparatus operation.

In this embodiment, the information of (a1), (a2), (a4), (a5), (a8), and (a9) is obtained, for example, from the control apparatus 26 of the lathe 2 (or the field computer 30), while (a3), (a6), (a7), and (a10) are obtained from the input information by the user. The method of obtaining the information is not limited to this, and at least a part of (a1), (a2), (a4), (a5), (a8), and (a9) may be obtained from input information by the user via the user interface 13. The information that can be obtained from the control apparatus 26 (or the field computer 30) among (a3), (a6), (a7), and (a10) may be obtained from the control apparatus 26 (or the field computer 30). The information that is supposed to be acquired from the control apparatus 26 (or the field computer 30) may also be acquired from an alternative device (e.g., another computer or the sensor itself).

The tool information 1414 is information about each tool 3. The tool information 1414 includes the following information.

(b1) Tool 3 identifier (tool ID: e.g., serial number, etc.). The tool 3 identifier may be automatically assigned by the CPU 11 executing the configuration information acquisition program 1412.

(b2) Model number of tool 3.

(b3) Material, shape, mechanical material properties (Young's modulus, Poisson's ratio, transverse modulus, etc.), usage history, temperature, etc. of the tool 3. Since the stiffness varies depending on the material and shape of the tool 3, this information is also information on the stiffness. Unless otherwise specified, "shape" includes not only the three-dimensional shape and cross-sectional shape illustrated in drawings or CAD data in general terms, but also typical values obtained from the shape, such as the length of the tool 3 protruding from the tool rest 25 when the tool 3 is mounted on the tool rest 25 (protrusion length) and the straightness of the tool 3.

In this embodiment, the information (b1) to (b3) is obtained from the input information via the user interface 13 by the user, for example, but information that can be obtained from the control apparatus 26 (or the field computer 30) may be obtained from the control apparatus 26 (or the field computer 30).

The work information 1415. The work information 1415 includes, for example, shape data of the workpiece 1 before machining, material, mechanical material property rigidity (Young's modulus, Poisson's ratio, transverse modulus of elasticity, etc.), and machining target shape data of the workpiece 1, and the like. The machining target shape data is the data that indicates the target shape when machining by the NC program. If the workpiece 1 can be machined to the target shape concerned, it means that the error is zero. The work information 1415 may be obtained from the control apparatus 26 (or the field computer 30), or from input information via the user interface 13 by the user.

The before-correction NC program 1416 is an NC program created by CAM to be used on a lathe. The before-correction NC program 1416 is generated and transmitted by a computer equipped with CAM, which is not illustrated in the figure.

The after-correction NC program 1417 is the NC program obtained by converting the before-correction NC program 1416 to fit the turning process for a specific workpiece on the lathe 2. If no conversion process has been performed on any of the before-correction NC programs 1416, the after-correction NC program 1417 does not exist.

<Program that Runs on Conversion Computer>

<<Conversion Program 1411>>

The conversion program 1411 is executed by the CPU 11 to perform the following processes.

The conversion program 1411 executes the process of generating the after-correction NC program 1417 from the before-correction NC program 1416. The details of the process will be described later.

<<Configuration Information Acquisition Program 1412>>

The configuration information acquisition program 1412 is executed by the CPU 11 to perform the following processes.

The configuration information acquisition program 1412 acquires various information about the lathe 2 from the control apparatus 26 of the lathe 2. The information to be acquired includes the information on (a1), (a2), (a4), (a5), (a8), and (a9) described above.

The configuration information acquisition program 1412 acquires various information from the user via the user interface 13 (information about the lathe 2 to be acquired from the user ((a3), (a6), (a7), and (a10)), and information about the tool information 1414 ((b1) to (b3)).

Next, the functional configuration of the conversion computer 10 is described.

Figure 3:
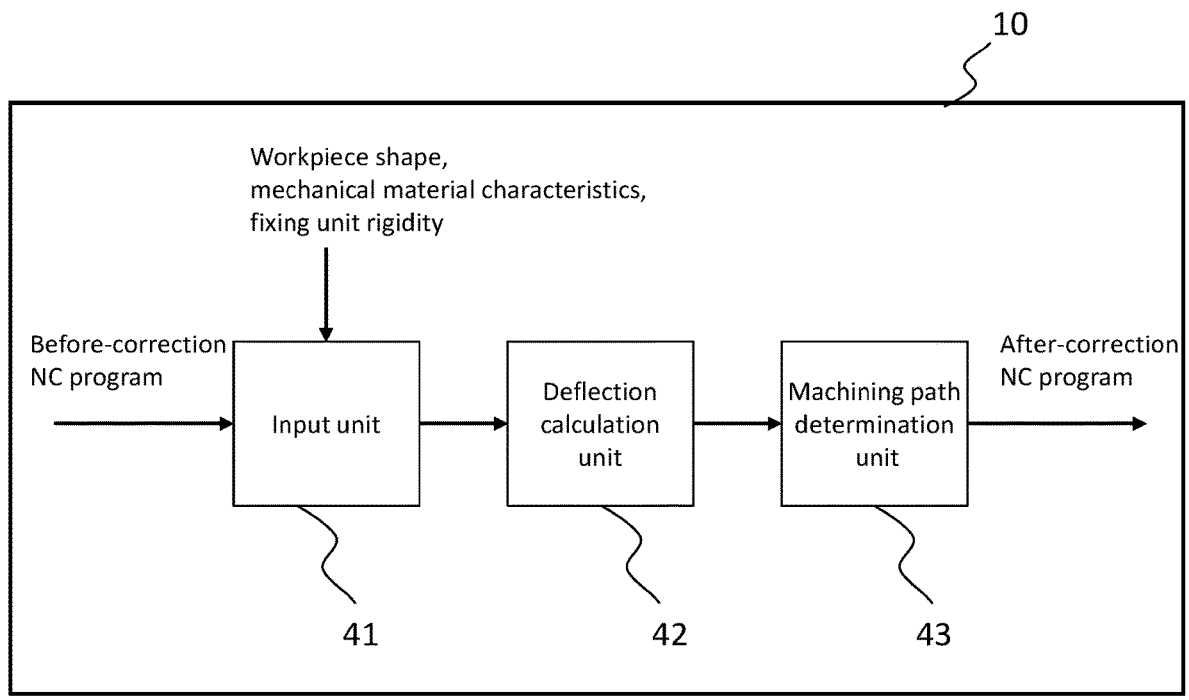
FIG. 3 is a functional configuration diagram of a conversion computer according to Embodiment 1.

FIG. 3 is a functional configuration diagram of the conversion computer according to Embodiment 1.

The conversion computer 10 includes an input unit 41, a deflection calculation unit 42, and a machining path determination unit 43. In this embodiment, the input unit 41 is configured by the CPU 11 executing the configuration information acquisition program 1412, and the deflection calculation unit 42 and the machining path determination unit 43 are configured by the CPU 11 executing the conversion program 1411.

The input unit 41 inputs the shape of the workpiece, the mechanical material properties of the workpiece, and the rigidity of the part of the lathe 2 that fixes the workpiece (the main spindle 21 and the fixing jig 22: an example of fixing unit, and these are referred to as workpiece fixing unit). In addition, the input unit 41 inputs the before-correction NC program 1416.

The shape of the workpiece may be the shape of the workpiece before machining (material shape) or the target shape after machining of the workpiece. The mechanical material properties of the workpiece include at least the Young's modulus of the material of the workpiece. The mechanical material properties may also include Poisson's ratio or transverse modulus of elasticity. The stiffness of the workpiece fixing unit includes the translational spring coefficient and rotational spring coefficient at the workpiece fixing unit. The translational spring coefficient is the reciprocal of the displacement for a unit load, and the rotational spring coefficient is the reciprocal of the deflection angle for a unit moment. The translational spring coefficient and rotational spring coefficient can be identified in advance by analysis or measurement, and the identified coefficients can be used.

The deflection calculation unit 42 calculates the displacements occurring to the workpiece at multiple machining positions. Here, the displacements generated against the workpiece include the deflection of the workpiece and the displacement caused by the deflection of the workpiece fixing unit to which the workpiece is mounted. Since the rigidity of the workpiece fixing unit is higher than the rigidity of the workpiece, the latter displacement may not be included in the displacements occurring against the workpiece in some cases. Since the workpiece to be turned is generally rotationally symmetric, the workpiece can be modeled as a stepped beam, and the deflection of the workpiece can be calculated by using the finite elements of the beam. Specifically, the deflection calculation unit 42 analyzes the machining path before correction, that is, the machining path when the deflection of the workpiece, etc., is not taken into account, and identifies a plurality of machining positions. Here, the machining path before correction can be identified from the commands (blocks) of the before-correction NC program 1416. If the machining path is generated based on the target shape of the workpiece in the control apparatus 26, the generated machining path can be used.

The displacement at a certain machining position (target machining position) can be calculated by dividing the stepped beam model of the workpiece at the target machining position, setting a node, giving the cutting force in the turning process as a shear load, and solving for the rigidity of the workpiece fixing unit as a boundary condition. The shape of the workpiece used as a stepped beam model is preferably the shape of the workpiece (intermediate shape) when it reaches the target machining position by successively removing the parts that interfere with the tool based on the material shape, but it may also be the material shape or the target shape after machining. The cutting force is preferably calculated by analyzing the volume, cross-sectional area, and depth of cut of the removed area at the target machining position, but it may be obtained from the machining conditions such as the set depth of cut and feed, or the cutting force measured during actual machining may be used.

The machining path determination unit 43 uses the calculated displacement to determine an appropriate machining path. If the workpiece is displaced during machining due to deformation caused by deflection, etc., the machining amount will change and the diameter of the workpiece after machining will deviate from the target value. Therefore, when the workpiece is displaced away from the tool 3, the diameter of the workpiece after machining becomes larger than the target value. Therefore, the machining path determination unit 43 determines the machining path after correction by moving the machining path closer to the workpiece side to increase the depth of cut by the tool 3 so that the diameter becomes the target diameter with the workpiece displaced. When the workpiece is displaced so that it moves closer to the tool 3, the diameter of the workpiece after machining becomes smaller than the target value. Therefore, the machining path determination unit 43 determines the machining path after correction by moving the machining path away from the workpiece to reduce the depth of cut by the tool 3 so that the diameter becomes the target diameter with the workpiece displaced. For the machining path after correction, the positional coordinates of the before-correction NC program 1416 may be edited to the new positional coordinates after correction, or the positional coordinates of the before-correction NC program 1416 may be used as they are, and the value of the tool offset may be changed based on the difference between the positional coordinates before and after correction. For example, if the position coordinates of the before-correction NC program 1416 are used as they are and the tool offset is changed, the position coordinates configured in the before-correction NC program 1416 are also saved in the after-correction NC program 1417, making it easier for the user to check the NC program and the readability of the after-correction NC program 1417 can be maintained.

Since the displacement (basically, deflection) generated in the workpiece is generally curved with respect to the rotation axis direction, the ideal machining path is also curved. For this reason, when modifying the NC program, the machining path may be specified as a curve obtained by NURBS (Non-uniform rational B-spline) interpolation. The machining path may be an approximate broken line path obtained by dividing the machining path described in blocks of the NC program into a plurality of parts and performing a linear interpolation, or an approximate multi-circular arc path by performing a circular interpolation. For example, when machining path correction is performed by changing the tool offset, it is desirable to use an approximate broken line path by linear interpolation. When the machining path is generated based on the workpiece shape within the control apparatus 26, the machining path determination unit 43 may directly generate the machining path after correction that takes the displacement of the workpiece into account, without generating the machining path before correction.

Referring again to FIG. 1, the field computer 30 is described.

The field computer 30 is, for example, a personal computer or a general-purpose computer. The field computer 30 includes a CPU as an example of a processor, a network interface, a user interface, storage resource as an example of a storage unit, and an internal network coupling these components.

The storage resource of the field computer 30 stores a client program. The storage resource may also store the before-correction NC program.

<<Client Program>>

The client program is executed by the CPU to perform the following processes.

The client program instructs the conversion computer 10 to convert the NC program, receives the after-correction NC program from the conversion computer 10, and stores the after-correction NC program in the storage resource of the field computer 30 or the recording apparatus of the control apparatus 26.

The client program may read the before-correction NC program instructed by the user from the storage resource and send it to the conversion computer 10.

The client program may accept information input to the conversion computer 10 from the user via the user interface 13, or information input by the user from the control apparatus 26, etc., from the user of the field computer 30 instead of these, and send them to the conversion computer 10.

Next, the processing operation by the conversion computer 10 is described.

(Process 1) The configuration information acquisition program 1412 (strictly speaking, the CPU 11 executing the configuration information acquisition program 1412) acquires various information on the lathe 2 (e.g., (A1), (A2), (A4), (A5), (A8), and (A9)) that can be obtained from the control apparatus 26 of the lathe 2 coupled via the network 5. This process does not need to be performed every time the process 2 and subsequent processes described below are performed.

(Process 2) Next, the configuration information acquisition program 1412 receives the specification of the before-correction NC program 1416, which is to be converted, from the operator via the user interface 13. In addition, the configuration information acquisition program 1412 receives various information on the lathe 2 ((A3), (A6), (A7), and (A10)), information on the tools used on the lathe 2 ((B1) to (B3)), shape data before machining, material, and mechanical material property rigidity (Young's modulus, Poisson's ratio, transverse modulus of elasticity, etc.) of the workpiece 1 used on the lathe 2, and the machining target shape data of the workpiece 1 (direct input or selection input).

(Process 3) Next, when the conversion instruction of the NC program is received from the user via the user interface 13, the configuration information acquisition program 1412 sends a conversion start instruction to the conversion program 1411. Here, the conversion start instruction includes various information input (direct input or selection input) via the user interface 13.

(Process 4) When the conversion program 1411 receives the conversion start instruction, it reads the specified before-correction NC program 1416, executes the conversion process to convert the before-correction NC program 1416 into the after-correction NC program 1417, and stores the after-correction NC program 1417 generated by the conversion in the storage resource 14.

(Process 5) Then, the conversion program 1411 sends the after-correction NC program 1417 stored in the storage resource 14 to the control apparatus 26 of the lathe 2.

After the workpiece 1 is fixed on the lathe 2, the control apparatus 26 of the lathe 2 executes the turning process on the workpiece 1 by executing the after-correction NC program 1417.

<Specific Example of Conversion Process by Conversion Program>

Next, a specific example of processing operation by the conversion computer 10 is described.

Figure 4:
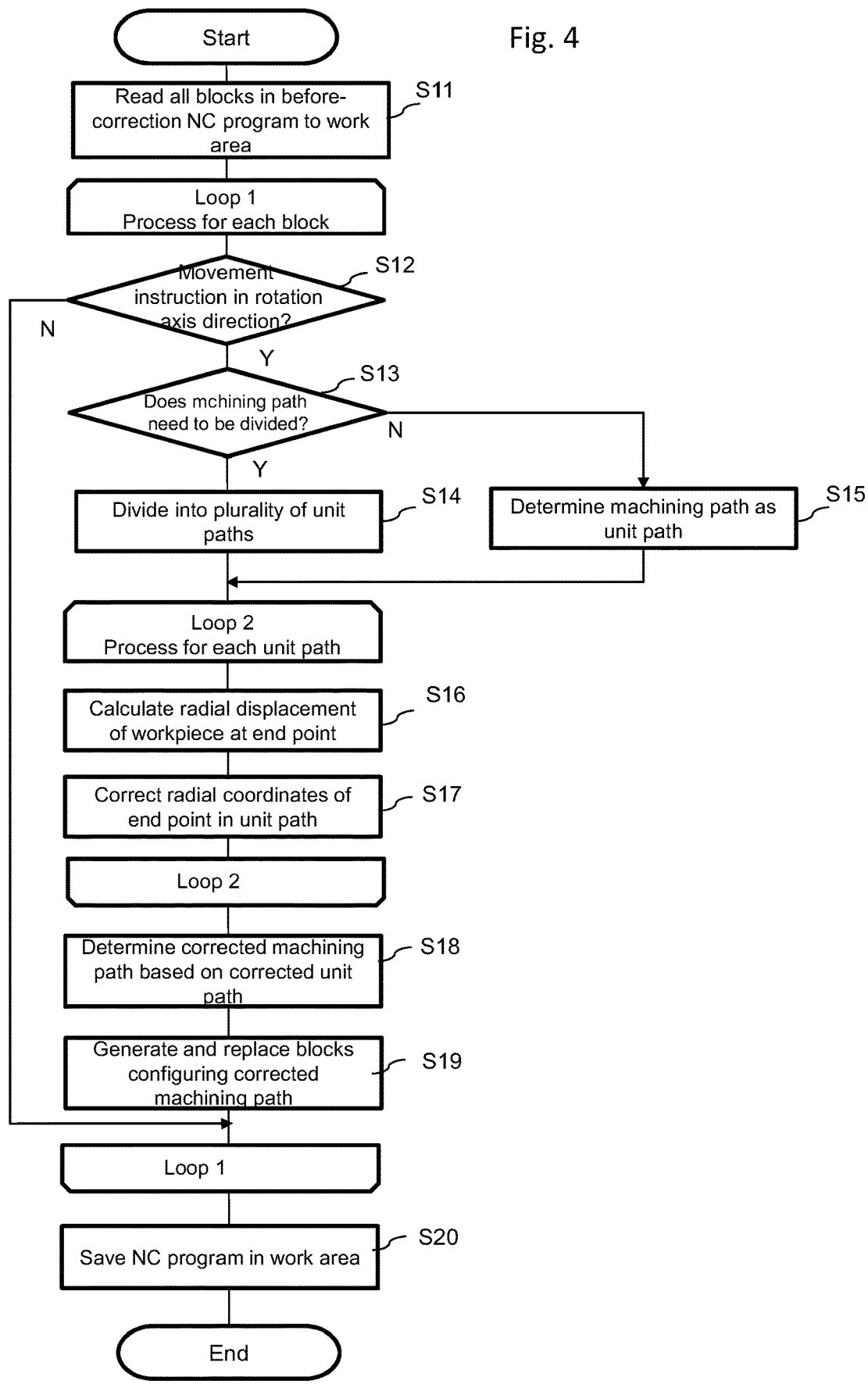
FIG. 4 is a flowchart for NC program conversion process according to Embodiment 1.

FIG. 4 is a flowchart for conversion process according to one embodiment.

First, the conversion program 1411 reads all blocks of the before-correction NC program 1416 to be processed to the work area of the memory among the storage resource 14 (S11). Here, a block indicates the part of the description that contains instructions (addresses) that can be instructed to the lathe 2 at one time in the machining process executed by the before-correction NC program 1416. A block includes one or more instructions (addresses) that can be instructed at the same time. The address may include, for example, a code indicating the type of instruction and a parameter regarding the content of the instruction. If the capacity of the before-correction NC program 1416 is too large to call up all blocks in the work area of the memory, the blocks to be read can be switched according to the progress of process. In addition, all blocks of the before-correction NC program 1416 to be processed may not be read out at once to the work area of the storage resource 14, but may be read out one block at a time, for example.

Next, the conversion program 1411 performs the loop 1 process (steps S12 to S19) for each block read in step S11. Here, the block to be processed in Loop 1 is called a target block.

In Loop 1, the conversion program 1411 determines whether the target block is a movement instruction in the direction of the rotation axis O of the main spindle 21 (Step S12). As a result, if the target block is not the movement instruction in the direction of the rotation axis O (Step S12: N), the conversion program 1411 proceeds the process to the end of Loop 1 (after Step S19).

On the other hand, if the target block is the movement instruction in the direction of the rotation axis (Step S12: Y), the conversion program 1411 determines whether or not the machining path of the movement instruction of the target block needs to be divided (Step S13). For example, if the length of the machining path in the direction of the rotation axis O is more than a predetermined value, it may be determined that the machining path needs to be divided.

As a result, if it is determined that the machining path of the movement instruction of the target block needs to be divided (Step S13: Y), the conversion program 1411 divides the machining path into a plurality of unit paths (Step S14). Here, the number of divisions is arbitrary, but basically, the greater the number of divisions, the more detailed and appropriate the machining path can be identified.

On the other hand, if it is determined that there is no need to divide the machining path of the move command of the target block (Step S13: N), the conversion program 1411 determines the machining path of the target block as a unit path (Step S15).

After determining the unit path in step S14 or step S15, the conversion program 1411 performs the loop 2 process (steps S16 and S17) for each unit path.

In loop 2, the conversion program 1411 calculates the radial displacement of the rotation axis of the workpiece at the end point in the rotation axis direction of the unit path (step S16). Next, the conversion program 1411 corrects the coordinates in the radial direction of the end point of the unit path and determines the corrected unit path. Specifically, the conversion program 1411 adds the displacement calculated in step S16 to the coordinates in the radial direction at the end point of the unit path (step S17).

When the process of loop 2 is executed for all of the multiple unit paths divided in step S14 or for the unit path determined in step S15, the conversion program 1211 exits the process of loop 2 and determines a corrected machining path for the machining path of the target block based on the corrected unit path (step S18). The corrected machining path may be determined by connecting the end points of all the corrected unit paths with straight lines, or by obtaining an approximate line (straight line or curve) based on each end point. When the corrected machining path is an approximate line, the corrected machining path may be divided in the direction of the rotation axis, and the number of divisions may be determined so that the approximation error at each divided point is less than a predetermined value.

Next, the conversion program 1411 generates a correction block (or group of blocks), which is the block (or group of blocks) that corresponds the corrected machining path determined in step S18, and replaces the target block in the work area with the generated correction block (or group of correction blocks) (step S19).

After the conversion program 1411 executes the loop 1 process for the target block, it performs the loop 1 process with the next block as the target block, and exits the loop 1 process when it has performed the loop 1 process for all blocks.

Next, the conversion program 1411 stores the NC program in the work area in the storage resource 14 as the after-correction NC program 1417 (Step S20), and ends the process.

According to the conversion process described above, the machining path is corrected based on the radial displacement of the rotation axis due to deflection of the workpiece, etc., and the block corresponding to the corrected machining path is generated, so that an after-correction NC program can be generated that can appropriately suppress the effects of displacement due to deflection of the workpiece, etc., in the turning process. As a result, the effects of deflection, etc. of the workpiece can be appropriately suppressed by executing the after-correction NC program, and the machining accuracy of the machined product can be improved.

Next, an example of a turning process using the before-correction NC program 1416 (comparison example) is specifically compared with an example of a turning process using the after-correction NC program 1417. Here, the example of a turning process in which a cylindrical workpiece is turned so that it has a constant diameter is described.

First, the turning process by the before-correction NC program 1416 is described.

Figure 5:
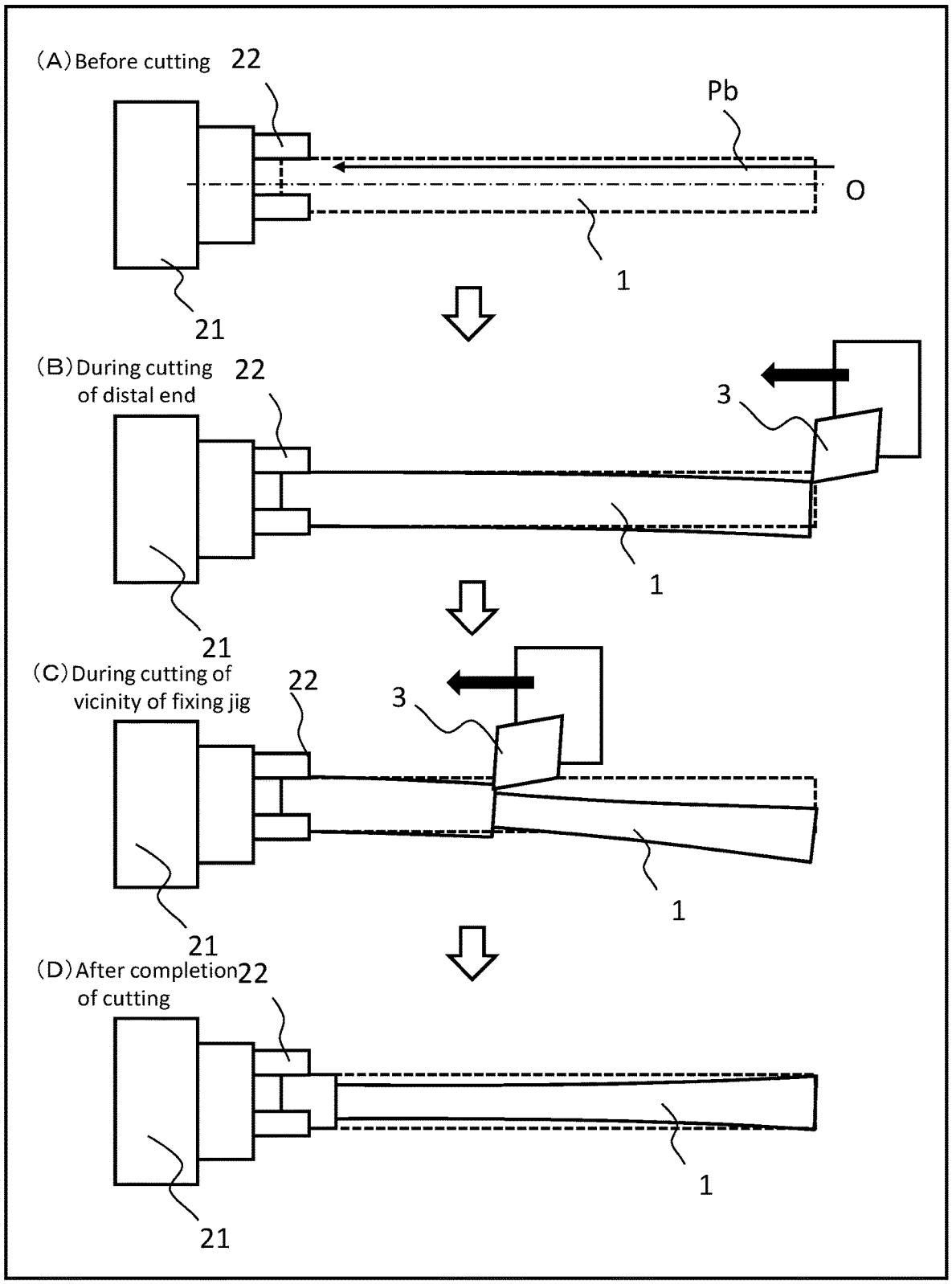
FIG. 5 illustrates the state of the turning process according to a comparative example.

FIG. 5 the state of the turning process for the comparative example. FIG. 5(A) illustrates the state before cutting, FIG. 5(B) illustrates the state of cutting a distal end side of the workpiece, FIG. 5(C) illustrates the state of cutting the vicinity of the fixing jig of the workpiece, and FIG. 5(D) illustrates the state after cutting is completed.

In the before-correction NC program 1416, as illustrated in FIG. 5(A), the machining path Pb is a path parallel to the rotation axis O toward the main spindle 21.

When the turning process of the distal end side of the workpiece 1 is started according to the machining path Pb, the workpiece 1 is displaced downward in the drawing by the cutting force of the tool 3, as illustrated in FIG. 5(B).

After that, when the tool 3 is moved toward the main spindle 21 along the machining path Pb, the workpiece 1 is displaced downward as illustrated in FIG. 5(C), even in the vicinity of the fixing jig 22. The amount of displacement of the workpiece 1 is smaller than that during cutting on the distal end side.

After that, when the tool 3 is moved to the endpoint of the machining path Pb, the turning process on the workpiece 1 is completed and the state illustrated in FIG. 5(D) is reached.

According to the turning process using the before-correction NC program 1416 described above, the closer to the distal end part of the workpiece 1 where the displacement is large, the less the cutting depth by the tool 3 is, so the shape of the workpiece 1 after the cutting is completed has a larger diameter at the distal end part and a smaller diameter closer to the fixing jig 22, as illustrated in FIG. 5(D). Thus, according to the before-correction NC program 1416, the machining accuracy of the workpiece 1 obtained by machining is poor.

Next, the turning process using the after-correction NC program 1417 is described.

Figure 6:
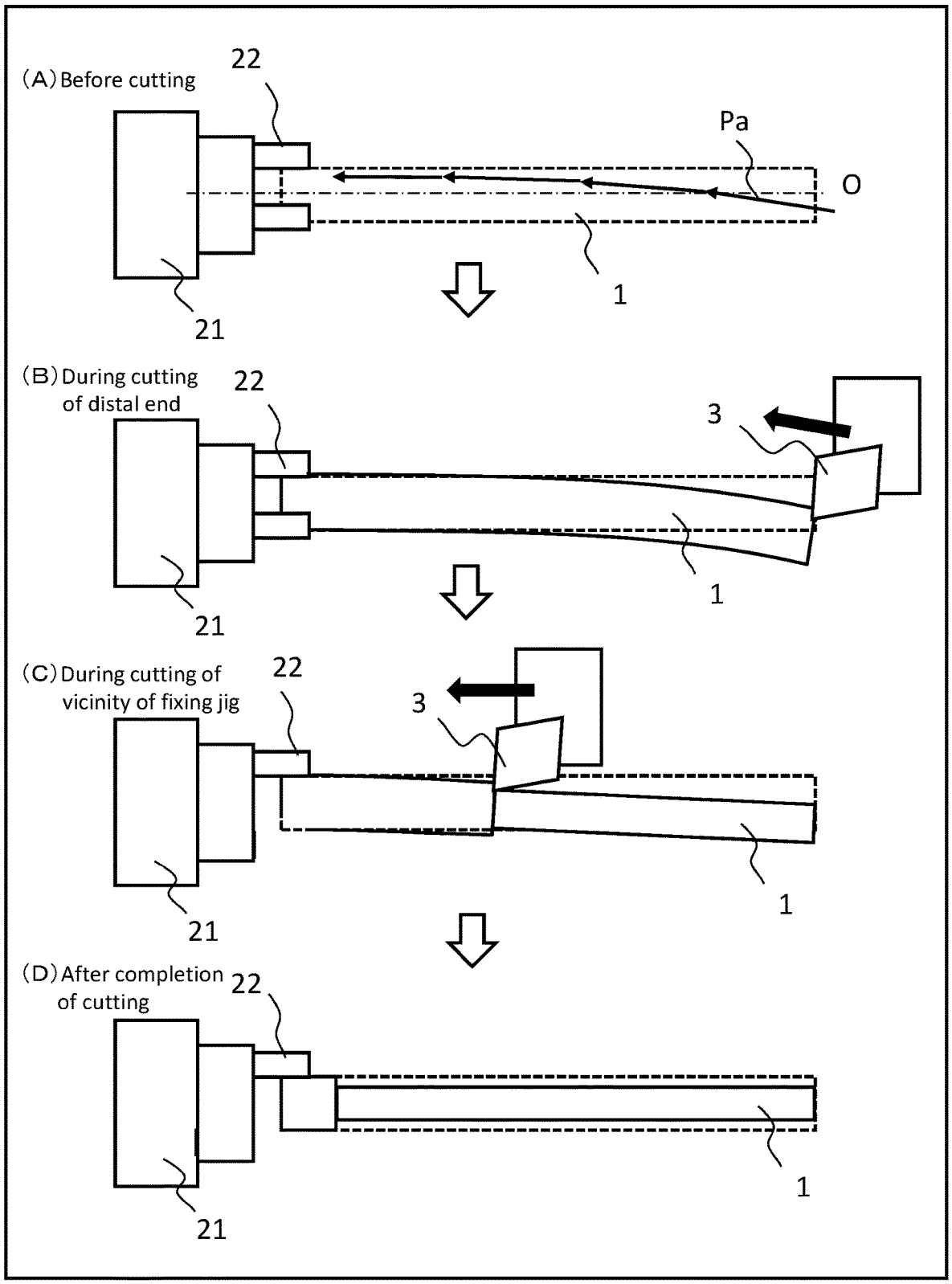
FIG. 6 illustrates the state of the turning process according to Embodiment 1.

FIG. 6 illustrates the state of the turning process for Embodiment 1. FIG. 6(A) illustrates the state before cutting, FIG. 6(B) illustrates the state of cutting the distal end side of the workpiece, FIG. 6(C) illustrates the state of cutting the vicinity of the fixing jig of the workpiece, and FIG. 6(D) illustrates the state after cutting is completed.

In the after-correction NC program 1417, as illustrated in FIG. 6(A), the machining path Pa is corrected so that the closer to the distal end part of the workpiece 1, where displacement is large, the machining path of the tool 3 is lower in the drawing with respect to the machining path Pb.

When the turning process on the distal end side of the workpiece 1 is started according to the machining path Pa, the cutting force of the tool 3 displaces the workpiece 1 downward in the drawing as illustrated in FIG. 6(B), but since the machining path Pa is lower in the drawing than the machining path Pb, the depth of cut is larger than that illustrated in FIG. 5(B).

After that, when the tool 3 is moved toward the main spindle 21 along the machining path Pa, the workpiece 1 is displaced downward as illustrated in FIG. 6(C), even in the vicinity of the fixing jig 22. Here, the amount of displacement of the workpiece 1 is smaller than when cutting the distal end side, but the position of the machining path Pa is higher in the drawing than that of the distal end side, resulting in a depth of cut that is almost the same as that of the distal end side in FIG. 6(B).

After that, when the tool 3 is moved to the endpoint of the machining path Pa, the turning process on the workpiece 1 is completed and the state illustrated in FIG. 6(D) is reached.

According to the turning process using the after-correction NC program 1416 described above, the amount of correction of the machining path is larger the closer it is to the distal end part of the workpiece 1, which has a larger displacement, and the amount of correction of the machining path is smaller the closer it is to the fixing jig 22, which has a smaller displacement, so that the depth of cut by the tool 3 is almost the same in the entire range in the direction of the rotation axis O. As a result, the shape of the workpiece 1 after the cutting is completed can be made almost the same diameter as illustrated in FIG. 6(D). In this way, according to the after-correction NC program 1417, the machining accuracy of the workpiece 1 obtained by machining can be improved. If the displacement occurring in the workpiece includes the displacement caused by the workpiece fixing unit, the machining accuracy can be further improved because the deterioration of the machining accuracy due to the displacement of the workpiece caused by the workpiece fixing unit can be suppressed.

Variations on Embodiment 1

Figure 7:
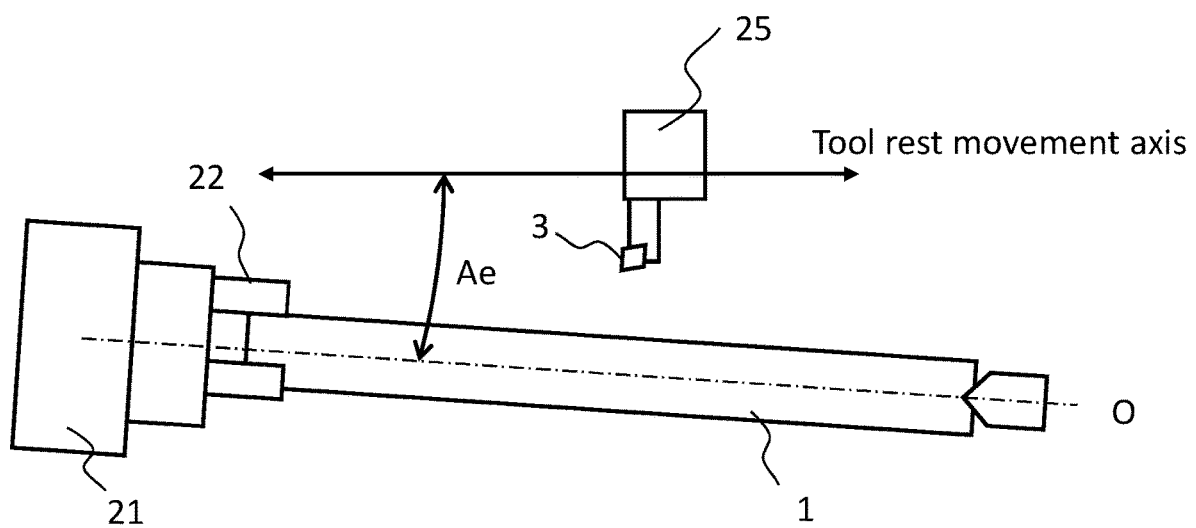
FIG. 7 illustrates an example of a relation between a rotation axis of a lathe and a movement axis of a tool rest.

FIG. 7 illustrates an example of the relationship between the rotation axis of the lathe and the movement axis of the tool rest.

Generally, there is a small tilt error between the rotation axis O of the main spindle 21 of the lathe 2 and the movement axis (Z-axis) in the direction of the rotation axis O of the tool rest 25, and this tilt error becomes an error factor in the turning process. For example, between the rotation axis O of the workpiece 1 fixed by the fixing jig 22 and the tailstock 23 and the Z-axis, the tilt is caused by the vertical movement of the position of the tailstock 23. As another example, when the workpiece 1 is fixed only with the fixing jig 22, the weight of the workpiece 1 tilts the main spindle 21 downward, resulting in tilting between it and the Z-axis. Therefore, in the above embodiment, the inclination (inter-axis inclination) between the rotation axis O of the main spindle 21 and the movement axis (Z-axis) in the direction of the rotation axis of the tool rest 25 is measured in advance, and the input unit 41 accepts the inter-axis inclination (an example of angle information), and the deflection calculation unit 42 adds the displacement of the workpiece at the machining position for which the displacement of the workpiece is to be calculated and the displacement based on the interaxial inclination at the process position, and based on the added displacement, determines the corrected machining path in the same manner as described above.

In this way, the effect of inter-axial tilting in the cutting process can be reduced, and the machining accuracy of the workpiece can be improved.

Next, the experimental results of the diameter error of workpiece 1 in the turning process with the before-correction NC program 1416 and after-correction NC program 1417 is described.

Figure 8:
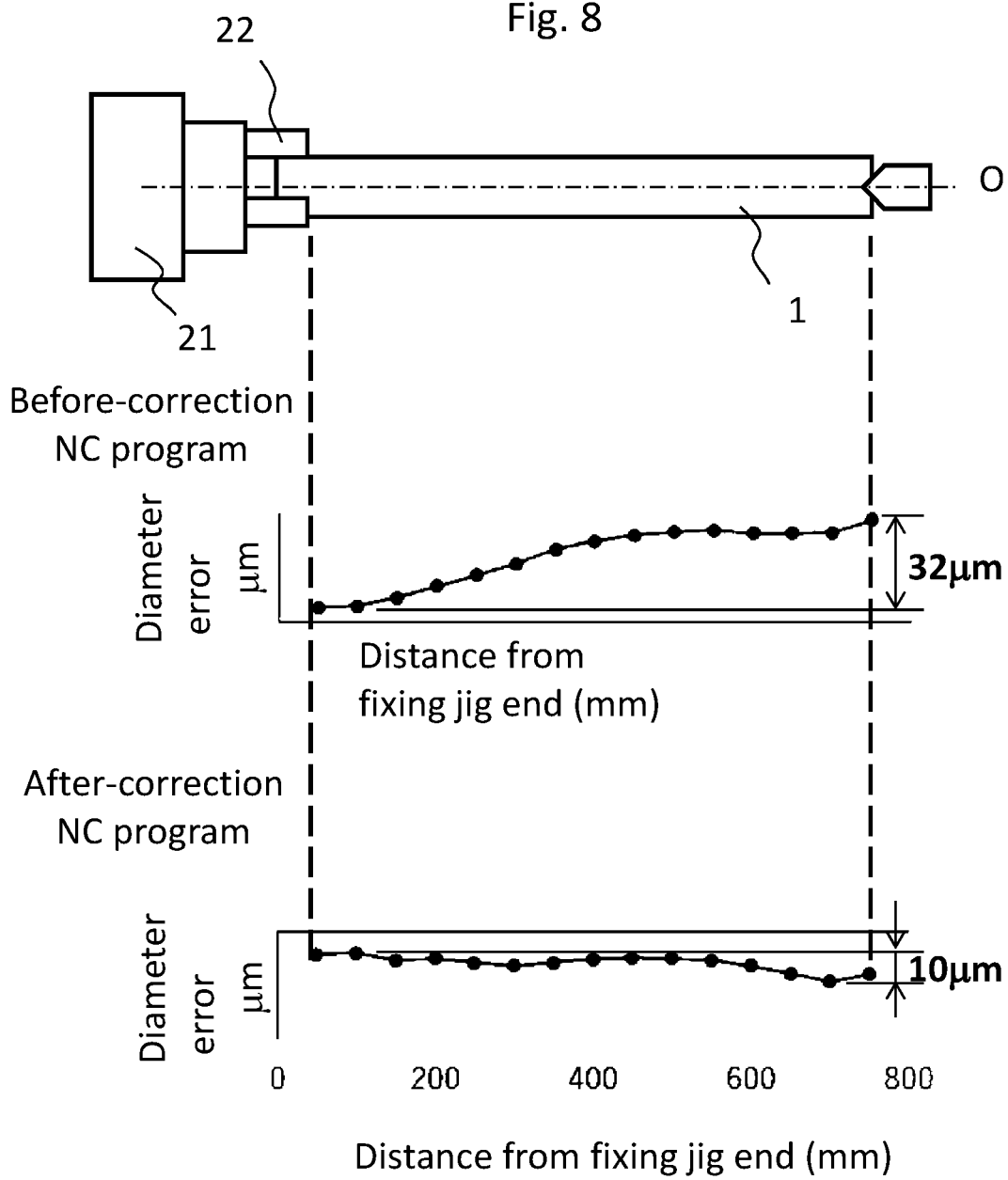
FIG. 8 illustrates experimental results of diameter errors by turning process in Embodiment 1 and the comparative example.

FIG. 8 illustrates the experimental results of diameter error due to turning between Embodiment 1 and the comparative example.

In the experiment illustrated in FIG. 8, a round bar of S45C (Young's modulus 206 GPa, Poisson's ratio 0.3, diameter 50 mm, length 800 mm) was used as workpiece 1. The workpiece 1 was fixed by the fixing jig 22 by 50 mm, and an end surface of the workpiece 1 on the side opposite to the fixing jig 22 was fixed by the tailstock 23. Turning was performed using the before-correction NC program 1416 and the after-correction NC program 1417, respectively, with a number of revolutions of 650 min$^{-1}$, a feed of 0.1 mm/rev, and a depth of cut of 0.1 mm. The inclination of the workpiece 1 was assumed to be 0.016 mm at the end face of the tailstock.

When the turning process was performed using the before-correction NC program 1416, the maximum diameter error was 0.030 mm. On the other hand, when turning was performed using the after-correction NC program 1417, which takes into account the displacement such as deflection of the workpiece 1, the maximum diameter error was 0.010 mm. This means that the maximum diameter error of the workpiece 1 can be reduced by performing the turning process with the after-correction NC program 1417.

<Actions and Effects>

According to the above embodiment, the before-correction NC program is converted to the after-correction NC program, which is corrected to the machining path determined based on the displacement including the deflection of the workpiece during machining, so that the machining accuracy in the turning process on the lathe 2 can be improved.

Embodiment 2

Next, a conversion computer according to Embodiment 2 is described. In Embodiment 2, for the sake of convenience, the same symbols as in the conversion computer according to Embodiment 1 are used, and the differences are mainly described.

If the rigidity of the tool 3 is low, the deflection of the tool 3 also adversely affects the machining accuracy of the workpiece 1. For example, when machining an inner diameter on a workpiece, the protrusion of the tool 3 from the tool rest 25 is long, and the rigidity in the radial direction of the rotation axis O becomes low. Therefore, the conversion computer according to Embodiment 2 takes into account the displacements including deflection of the tool 3 to improve the machining accuracy.

Specifically, the input unit 41 accepts the shape of the tool 3, the mechanical material properties of the tool 3, and the rigidity information of the tool rest 25. The deflection calculation unit 42 further calculates the displacement due to deflection of the tool 3 and the like. Similar to the method for calculating the deflection of a workpiece, the deflection of the tool 3 can be calculated as the displacement of the cutting edge as the tool deflection by giving the cutting force as a shear load loaded on the cutting edge portion and solving the stiffness matrix with the spring coefficient at the end face of the tool rest 25 as the boundary condition. Here, the relative machining error seen from the tool 3 is the sum of the displacement of the workpiece 1 and the displacement of the tool 3. Therefore, the deflection calculation unit 42 calculates the displacement by adding the displacement of the workpiece 1 and the displacement of the tool 3. The machining path determination unit 43 determines the corrected machining path by using the displacement calculated by adding the displacements of the workpiece 1 and the tool 3 calculated by the deflection calculation unit 42 and performing the same process as in Embodiment 1.

According to this embodiment, since the corrected machining path can take into account the displacement of the workpiece 1 and the displacement of the tool 3, the effect of these displacements on the cutting process can be reduced, and the machining accuracy of the workpiece can be improved.

Embodiment 3

Next, a conversion computer according to Embodiment 3 is described. In Embodiment 3, for the sake of convenience, the same symbols as in the conversion computer according to Embodiment 1 are used, and the differences are mainly described.

For example, when the rigidity of the workpiece 1 is extremely low, if an attempt is made to offset machining errors caused by distortion of the workpiece 1 by only changing the machining path, the cutting depth by the tool 3 may become excessively large and the workpiece 1 may be plastically deformed or damaged.

Therefore, in this embodiment, the feed rate of the tool 3 is corrected in addition to the correction of the machining path. Specifically, the conversion program 1411 (e.g., the machining path determination unit 43) corrects the feed rate of the tool 3 to reduce the feed rate of the tool 3 to become the target amount of compensation, when the amount of correction of the machining path is large according to the feed rate before correction described in the before-correction NC program 1416, and the amount of correction is configured to the target correction amount. In this way, damage to the workpiece 1 can be suppressed. If the rigidity of the workpiece 1 is sufficient, the conversion program 1411 may correct to increase the feed rate before correction, and the correction amount of the machining path may be the correction amount corresponding to the feed rate after correction. For example, in the case where the workpiece 1 is fixed only with the fixing jig 22 and machined, the feed rate during machining at the vicinity of the fixing jig 22 can be faster than the feed rate during machining of the leading edge of the workpiece 1 because of the higher rigidity in the vicinity of the fixing jig 22.

Next, feed speed and correction of a machining path are described.

Figure 9:
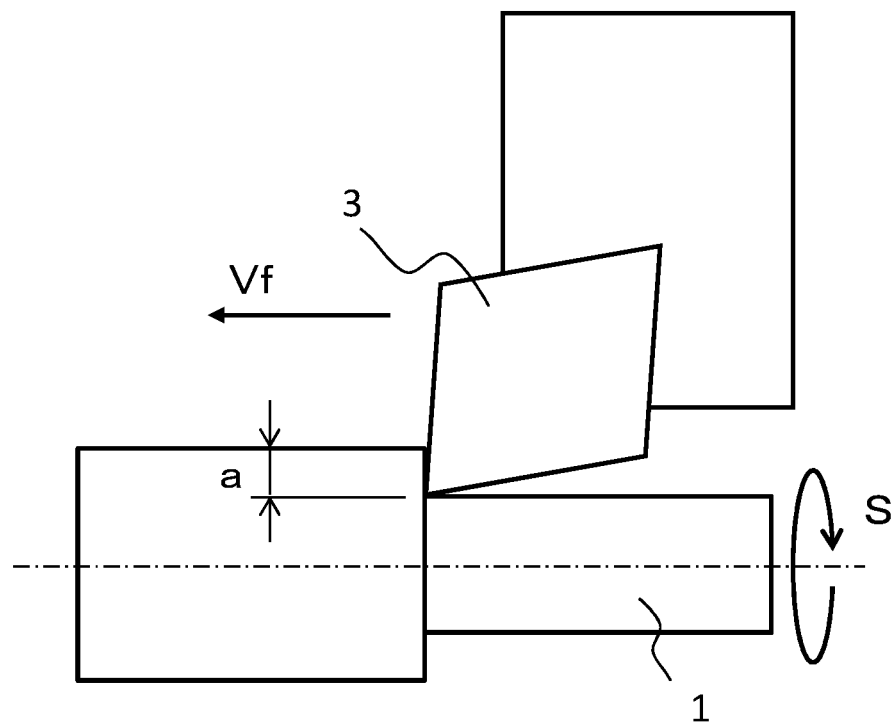
FIG. 9 illustrates values related to turning of a workpiece.

FIG. 9 illustrates values related to turning of a workpiece.

The cutting force F applied to the workpiece 1 can be modeled by the following equation (1).

$$F = (Kc \times Vf/S + Ke) \times a \qquad (1)$$

where a is the depth of cut illustrated in FIG. 9, Vf is the feed rate illustrated in FIG. 9, S is the rotational speed of the workpiece illustrated in FIG. 9, Kc is the cutting force coefficient for the cutting cross-sectional area, and Ke is the cutting force coefficient for the depth of cut.

Assuming that the deformation of the workpiece 1, etc. is elastic deformation, the displacement is proportional to the cutting force F. Therefore, using the displacement δ in the after-correction NC program when the feed rate is not changed and the target displacement δt, the corrected feed rate Vft can be expressed by the following equation (2).

$$Vft = (\delta t/\delta) \times Vf + (\delta t/\delta - 1) \times (S \times Ke/Kc) \qquad (2)$$

Therefore, the machining path determination unit 43 determines the target displacement δt, makes the correction to change the feed rate calculated according to formula (2), corrects the machining path according to the displacement δt, and outputs the corresponding after-correction NC program. The feed rate Vft to be corrected may be determined first, and then the displacement δt may be calculated according to the relationship in Equation (2).

According to this after-correction NC program 1417, excessive depth of cut can be reduced and machining time can be shortened.

Embodiment 4

Next, a conversion computer according to Embodiment 4 is described. In Embodiment 4, for the sake of convenience, the same symbols as in the conversion computer according to Embodiment 1 are used, and the differences are mainly described.

Figure 10:
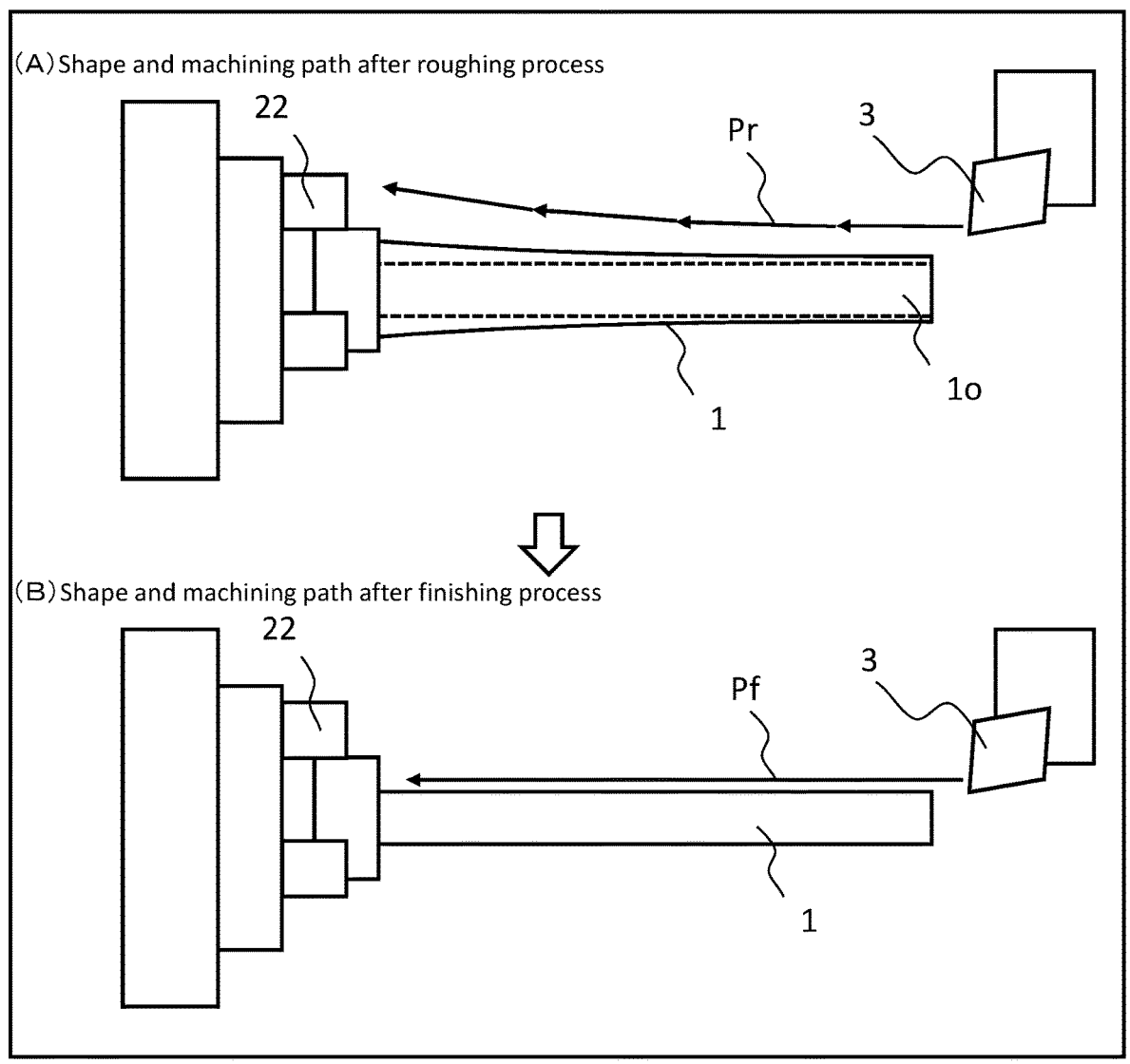
FIG. 10 illustrates roughing machining and finishing machining according to Embodiment 4.

FIG. 10 illustrates a roughing machining and a finishing process machining to Embodiment 4.

For example, in the machining of a workpiece 1, roughing machining may first be performed to machine the workpiece 1 to a shape close to the target shape, followed by finishing machining to machine the workpiece to the final target shape. In this case, if the feed rate of the tool 3 is changed during the finishing machining, the machined surface roughness of the workpiece will change, and the appearance of the workpiece will change at the part where the feed rate is changed, which may cause appearance problems. In addition, if the machining path is approximated by a broken line or the like, the movement direction vector of the tool 3 changes at the changeover of the line segment of the machining path, and the appearance of the workpiece 1 may become problematic due to the appearance of swirls on the machined surface. For this reason, it may not be desirable to change the feed rate of the tool 3 or the machining path on the machined surface in the finishing machining.

Therefore, the conversion program 1411 according to this embodiment, for the NC program for roughing machining, ensures that the displacement of the workpiece 1 in the subsequent finishing machining is constant in the direction of the rotation axis. Specifically, the conversion program 1411 determines the machining path Pr (movement path for roughing machining) such that the depth of cut in roughing machining is increased so that the finishing allowance is decreased in the part where the rigidity of the workpiece 1 is low, and the depth of cut in roughing machining is decreased so that the finishing allowance is relatively increased in the part where the rigidity of the work is high, as illustrated in FIG. 10(A).

Here, the cutting force F in the finishing machining can be modeled as proportional to the finishing allowance a (=depth of cut in finishing machining).

The displacement δ in the finishing machining can be expressed by equation (3) using the stiffness K in the finishing machining.

$$\delta = F/K \qquad (3)$$

Here, F∝a is satisfied, and also δ∝a/K is safisfied, the displacement of the workpiece at each machining position in the finishing process can be kept constant if the finishing allowance a is left in the roughing process so that a/K is constant.

Therefore, the conversion program 1411 generates the machining path Pr illustrated in FIG. 10(B), which leaves a finishing allowance a such that a/K is constant at each machining position in the NC program for roughing machining.

In this way, if the displacement during finishing machining is constant, the machining path Pf of finishing machining can be configured to an offset from the machining path in the before-correction NC program 1416, so that no swirls remain on the machined surface. As a result, in finishing machining, the feed rate and machining path are not changed during machining, and highly accurate machining can be achieved.

In this embodiment, it may be possible to switch between the process of generating the NC program for roughing (roughing machining process) and the process of generating the NC program in Examples 1 to 3 (normal process). Therefore, the conversion program 1411 determines whether to perform roughing machining process or not, and executes either roughing machining process or normal process depending on the result. For example, the before-correction NC program may include a comment indicating whether or not the roughing machining process is to be performed, and the determination may be made based on the comment. For the tool number or the tool offset number, it may be defined that the tool is a roughing machining tool or a finishing machining tool, and based on whether the tool in the before-correction NC program is a roughing machining tool or not, it may be determined whether to perform roughing machining process or not. Also, whether or not the before-correction NC program is for roughing machining may be managed by NC program number or file name, and whether or not to perform roughing machining process may be determined based on the number or file name of the before-correction NC program. In addition, this embodiment is not limited to the combination of roughing machining and finishing machining, but can also be applied to pre-machining (e.g., mid-finishing machining or mid-machining, which also includes roughing machining), which is the machining before finishing machining. In this case, the description of "roughing machining" should be replaced with "pre-machining".

<Variations>

The present invention is not limited to the embodiments described above, and can be implemented with appropriate modifications to the extent that it does not depart from the purpose of the present invention. In addition, the processes described below may be used in combination.

For example, in Embodiment 4 above, the radial displacement of the workpiece is made constant over the entire machining range of the workpiece in the direction of the rotational axis, but the invention is not limited to this. For example, the radial displacement of the workpiece may be made constant in a part of the machining range of the workpiece in the direction of the rotation axis. In this way, the machining accuracy in the part of the machining range can be improved.

In addition, some or all of the processing that was performed by the CPU 11 in the above embodiments may be performed by hardware circuits. The program in the above embodiments may be installed from a program source. The program source may be a program distribution server or a non-volatile storage media (e.g., a portable storage media).

In each of the above embodiments, an example of the NC program generation system being configured with the conversion computer 10 is illustrated, but the NC program generation system may be configured with the control apparatus 26 of the lathe 2. In other words, the functions of the conversion computer 10 may be provided to the control apparatus 26.

The NC program generation system may be configured with multiple computers, and in this case, the functions of the conversion computer 10 can be executed by the processors of the multiple computers.

REFERENCE SIGNS LIST

1 Workpiece
2 Lathe

3 Tool
5 Network
10 Conversion computer
11 CPU
12 Network interface
13 User interface
14 Storage resource
21 Main spindle
22 Tool jig
23 Tailstock
25 Tool rest
26 Control apparatus
100 Processing system

The invention claimed is:

1. An NC program generation system including a processor, for generating an NC program for turning process of a workpiece by a lathe including a tool, wherein
the processor is configured to:
receive a before-correction NC program, including a plurality of blocks, that does not take a displacement generated on a workpiece during a turning process for turning process on the workpiece into account;
determine, for each of the plurality of blocks, if a movement instruction is included, the movement instruction including information to move the tool in an axial direction of a rotation axis of a fixing unit of the lathe for fixing the workpiece on the lathe;
on a condition that the movement instruction is included, determine whether a movement path of the tool used during the turning process from the movement instruction is greater than a predetermined value;
on a condition that the movement path is greater than the predetermined value, divide the movement path into a plurality of unit paths, and on a condition that the movement path is less than or equal to the predetermined value, the movement path is determined as a unit path;
calculate, for each of the plurality of unit paths and the unit path, a displacement generated on the workpiece at a plurality of machining positions during the turning process;
calculate, on the basis of the displacement generated on the workpiece at the plurality of machining positions, a corrected unit path of the tool used during the turning process,
wherein the corrected unit path includes coordinates in a radial direction;
determine, on the basis of the corrected unit path, a corrected movement path; and
generate an NC program for moving the tool along the determined corrected movement path.

2. The NC program generation system according to claim 1, wherein the processor is configured to:
receive shape information on the workpiece and mechanical material characteristics information on the workpiece; and
calculate, on the basis of the shape information on the workpiece and the mechanical material characteristics information on the workpiece, the displacement generated on the workpiece at the plurality of machining positions.

3. The NC program generation system according to claim 2, wherein the processor is configured to:
receive rigidity information on the fixing unit; and
calculate, on the basis of the shape information on the workpiece, the mechanical material characteristics information on the workpiece, and the rigidity information on the fixing unit, the displacement generated on the workpiece at the plurality of machining positions.

4. The NC program generation system according to claim 2, wherein the processor is configured to:
receive shape information on the tool, mechanical material characteristics information on the tool, and rigidity information on a tool fixing unit for fixing the tool to the lathe;
calculate, on the basis of the shape information on the tool, the mechanical material characteristics information on the tool, and the rigidity information on the tool fixing unit for fixing the tool to the lathe, a displacement generated on the tool at the plurality of machining positions; and
determine, on the basis of the displacement generated on the workpiece at the plurality of machining positions and the displacement generated on the tool, the movement path of the tool during the turning processing.

5. The NC program generation system according to claim 4, wherein the processor is configured to:
determine a feed speed of the tool during the turning process on the basis of the displacement generated on the workpiece at the plurality of machining positions and the displacement generated on the tool at the plurality of machining positions; and
generate an NC program for moving the tool with the determined feed speed.

6. The NC program generation system according to claim 2, wherein the processor is configured to:
determine, in a case that the turning process on the workpiece is a pre-process, which is a process executed before a finishing process, on the basis of the shape information on the workpiece and the mechanical material characteristics information on the workpiece, a pre-process movement path of the tool in which displacements generated on the workpiece are common in a movement range including the plurality of machining positions; and
generate an NC program for moving the tool by the pre-process movement path.

7. The NC program generation system according to claim 2, wherein the processor is configured to:
receive angle information between a rotation axis of the fixing unit and the movement direction of the tool; and
determine, on the basis of the displacement generated on the workpiece at the plurality of machining positions and the angle information, the corrected movement path of the tool used during the turning process.

8. The NC program generation system according to claim 1, wherein the processor is configured to:
acquire, from the plurality of blocks in the before-correction NC program, an axial direction movement block that is a block for moving the tool in the axial direction of the rotation axis of the fixing unit;
calculate, on the basis of the shape information on the workpiece and the mechanical material characteristics information on the workpiece, the displacement generated on the workpiece in a movement range of the axial direction movement block;
determine, on the basis of the displacement, the corrected movement path that is a movement path in which a radial movement position of the rotation axis in the axial direction movement block has been changed; and
generate a block of an NC program for moving the tool along the corrected movement path.

9. The NC program generation system according to claim 8, wherein the processor is configured to:
  calculate, on the basis of the shape information on the workpiece and the mechanical material characteristics information on the workpiece, a displacement generated on the workpiece in each of the plurality of unit paths;
  determine, on the basis of the displacements in the plurality of unit paths, the corrected movement; and
  generate one or more blocks of an NC program for moving the tool along the corrected movement path.

10. The NC program generation system according to claim 1, wherein the processor is configured to:
  generate at least one correction block that corresponds to the corrected movement path; and
  replace a block of the plurality of blocks with the at least one correction block that corresponds to the block.

11. The NC program generation system according to claim 1, wherein the processor is configured to:
  perform one of
    connecting a set of end points of the connected unit path via a line, or
    obtaining an approximate line based on each end point of the connected unit path; and
  determine the corrected movement path using either the line or the approximate line.

12. The NC program generation system according to claim 11, wherein on a condition that the corrected movement path is determined using the approximate line, the processor is configured to:
  divide the corrected movement path into a plurality of divisions in a direction of the rotation axis, and
  determine a number of the plurality of divisions such that an approximation error at each divided point created by the plurality of divisions is less than a predetermined amount.

13. An NC program generation method for an NC program generation system including a processor, for generating an NC program for turning process of a workpiece by a lathe including a tool, the method comprising:
  receiving a before-correction NC program, including a plurality of blocks, that does not take a displacement generated on a workpiece during a turning process for turning process on the workpiece into account;
  determining, for each of the plurality of blocks, if a movement instruction is included, the movement instruction including information to move the tool in an axial direction of a rotation axis of a fixing unit of the lathe for fixing the workpiece on the lathe;
  on a condition that the movement instruction is included, determining whether a movement path of the tool used during the turning process from the movement instruction is greater than a predetermined value;
  on a condition that the movement path is greater than the predetermined value, dividing the movement path into a plurality of unit paths, and on a condition that the movement path is less than or equal to the predetermined value, the movement path is determined as a unit path;
  calculating, for each of the plurality of unit paths and the unit path, a displacement generated on the workpiece at a plurality of machining positions during the turning process;
  calculating, on the basis of the displacement generated on the workpiece at the plurality of machining positions, a corrected unit path of the tool used during the turning process,
    wherein the corrected unit path includes coordinates in a radial direction;
  determining, on the basis of the corrected unit path, a corrected movement path; and
  generating an NC program for moving the tool along the determined corrected movement path.

14. The NC program generation method according to claim 13, comprising:
  receiving shape information on the workpiece and mechanical material characteristics information on the workpiece; and
  calculating, on the basis of the shape information on the workpiece and the mechanical material characteristics information on the workpiece, the displacement generated on the workpiece at the plurality of machining positions.

15. The NC program generation method according to claim 14, comprising:
  receiving rigidity information on the fixing unit; and
  calculating, on the basis of the shape information on the workpiece, the mechanical material characteristics information on the workpiece, and the rigidity information on the fixing unit, the displacement generated on the workpiece at the plurality of machining positions.

16. The NC program generation method according to claim 14, comprising:
  receiving shape information on the tool, mechanical material characteristics information on the tool, and rigidity information on the tool fixing unit for fixing the tool to the lathe;
  calculating, on the basis of the shape information on the tool, the mechanical material characteristics information on the tool, and the rigidity information on the tool fixing unit for fixing the tool to the lathe, a displacement generated on the tool at the plurality of machining positions; and
  determining, on the basis of the displacement generated on the workpiece at the plurality of machining positions and the displacement generated on the tool, the movement path of the tool during the turning process.

* * * * *